United States Patent
Baba et al.

(10) Patent No.: US 11,086,007 B2
(45) Date of Patent: Aug. 10, 2021

(54) TARGET DETECTION DEVICE

(71) Applicant: DENSO CORPORATION, Kariya (JP)

(72) Inventors: Takahiro Baba, Kariya (JP); Yusuke Yokoi, Kariya (JP)

(73) Assignee: DENSO CORPORATION, Kariya (JP)

( * ) Notice: Subject to any disclaimer, the term of this patent is extended or adjusted under 35 U.S.C. 154(b) by 185 days.

(21) Appl. No.: 16/321,171

(22) PCT Filed: Jul. 26, 2017

(86) PCT No.: PCT/JP2017/027126
§ 371 (c)(1),
(2) Date: Jan. 28, 2019

(87) PCT Pub. No.: WO2018/021444
PCT Pub. Date: Feb. 1, 2018

(65) Prior Publication Data
US 2019/0179006 A1 Jun. 13, 2019

(30) Foreign Application Priority Data

Jul. 29, 2016 (JP) .............................. JP2016-149673
Mar. 8, 2017 (JP) .............................. JP2017-044243

(51) Int. Cl.
*G01S 13/86* (2006.01)
*G08G 1/16* (2006.01)
(Continued)

(52) U.S. Cl.
CPC ............ *G01S 13/867* (2013.01); *G01S 7/412* (2013.01); *G01S 13/931* (2013.01); *G06T 7/70* (2017.01);
(Continued)

(58) Field of Classification Search
None
See application file for complete search history.

(56) References Cited

U.S. PATENT DOCUMENTS

| 7,825,849 B2 * | 11/2010 | Tsuchida | G01S 17/86 342/70 |
| 10,403,037 B1 * | 9/2019 | Boardman | G06T 7/60 |

(Continued)

FOREIGN PATENT DOCUMENTS

JP 2014-122873 A 7/2014

*Primary Examiner* — Christian Chace
*Assistant Examiner* — Amelia Vorce
(74) *Attorney, Agent, or Firm* — Maschoff Brennan

(57) ABSTRACT

A target detection device including a radar device and a monocular camera, including: a first detecting section detecting a position of a radar detection target; a second detecting section detecting a position of an image detection target which is a specific target; and a determination section that when the radar detection target and the image detection target are provisionally determined to be an identical target, and the image detection target is determined to be a predetermined type of target, determines that the radar detection target and the image detection target are not an identical target, and when the radar detection target and the image detection target are provisionally determined to be an identical target, and a predetermined target determination section determines that the image detection target is not the predetermined type of target, determines that the radar detection target and the image detection target are an identical target.

15 Claims, 6 Drawing Sheets

(51) Int. Cl.
  *G06T 7/70* (2017.01)
  *G01S 7/41* (2006.01)
  *G01S 13/931* (2020.01)

(52) U.S. Cl.
  CPC .... *G08G 1/166* (2013.01); *G01S 2013/93185* (2020.01); *G01S 2013/93271* (2020.01); *G06T 2207/30256* (2013.01); *G06T 2207/30261* (2013.01)

(56) References Cited

U.S. PATENT DOCUMENTS

| | | | | |
|---|---|---|---|---|
| 10,565,468 | B2* | 2/2020 | Schiffmann | G01S 13/42 |
| 2009/0228204 | A1* | 9/2009 | Zavoli | G01S 19/49 |
| | | | | 701/532 |
| 2010/0097200 | A1* | 4/2010 | Hilsebecher | G01S 7/412 |
| | | | | 340/436 |
| 2012/0106786 | A1* | 5/2012 | Shiraishi | G01S 13/867 |
| | | | | 382/103 |
| 2012/0170808 | A1* | 7/2012 | Ogata | G06K 9/00798 |
| | | | | 382/103 |
| 2012/0268602 | A1* | 10/2012 | Hirai | G06T 7/12 |
| | | | | 348/148 |
| 2013/0002470 | A1* | 1/2013 | Kambe | G01S 13/867 |
| | | | | 342/55 |
| 2013/0335259 | A1* | 12/2013 | Yasugi | G08G 1/04 |
| | | | | 342/52 |
| 2014/0002295 | A1* | 1/2014 | Kimata | G08G 1/165 |
| | | | | 342/70 |
| 2014/0139369 | A1 | 5/2014 | Baba | |
| 2015/0210274 | A1* | 7/2015 | Clarke | B60K 31/00 |
| | | | | 382/104 |
| 2015/0334269 | A1* | 11/2015 | Yokota | G06T 7/251 |
| | | | | 382/103 |
| 2016/0012283 | A1* | 1/2016 | Mitoma | B60R 1/00 |
| | | | | 382/103 |
| 2016/0014406 | A1* | 1/2016 | Takahashi | G06T 7/246 |
| | | | | 348/148 |
| 2016/0137157 | A1* | 5/2016 | Sasabuchi | G06T 7/246 |
| | | | | 382/103 |
| 2016/0304098 | A1* | 10/2016 | Ito | G06K 9/00798 |
| 2016/0349364 | A1* | 12/2016 | Hara | G01S 13/867 |
| 2017/0217394 | A1* | 8/2017 | Shima | B60R 21/00 |

* cited by examiner

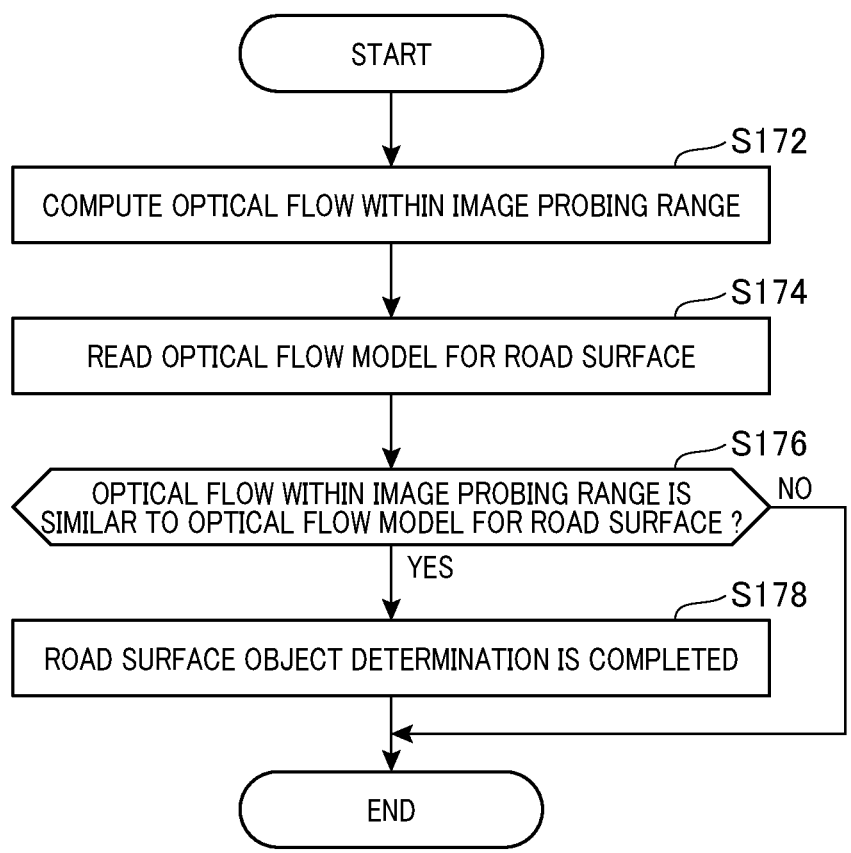

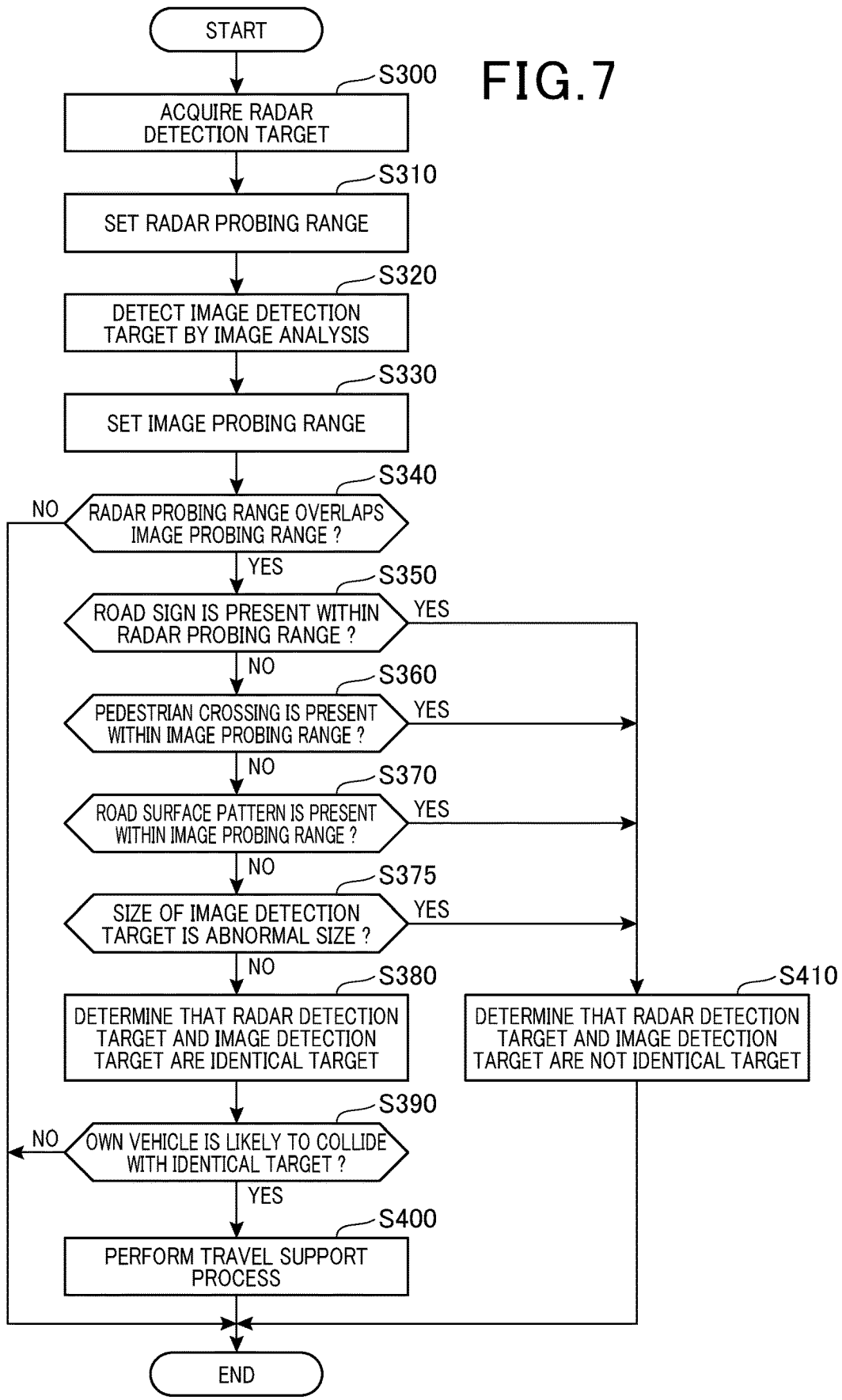

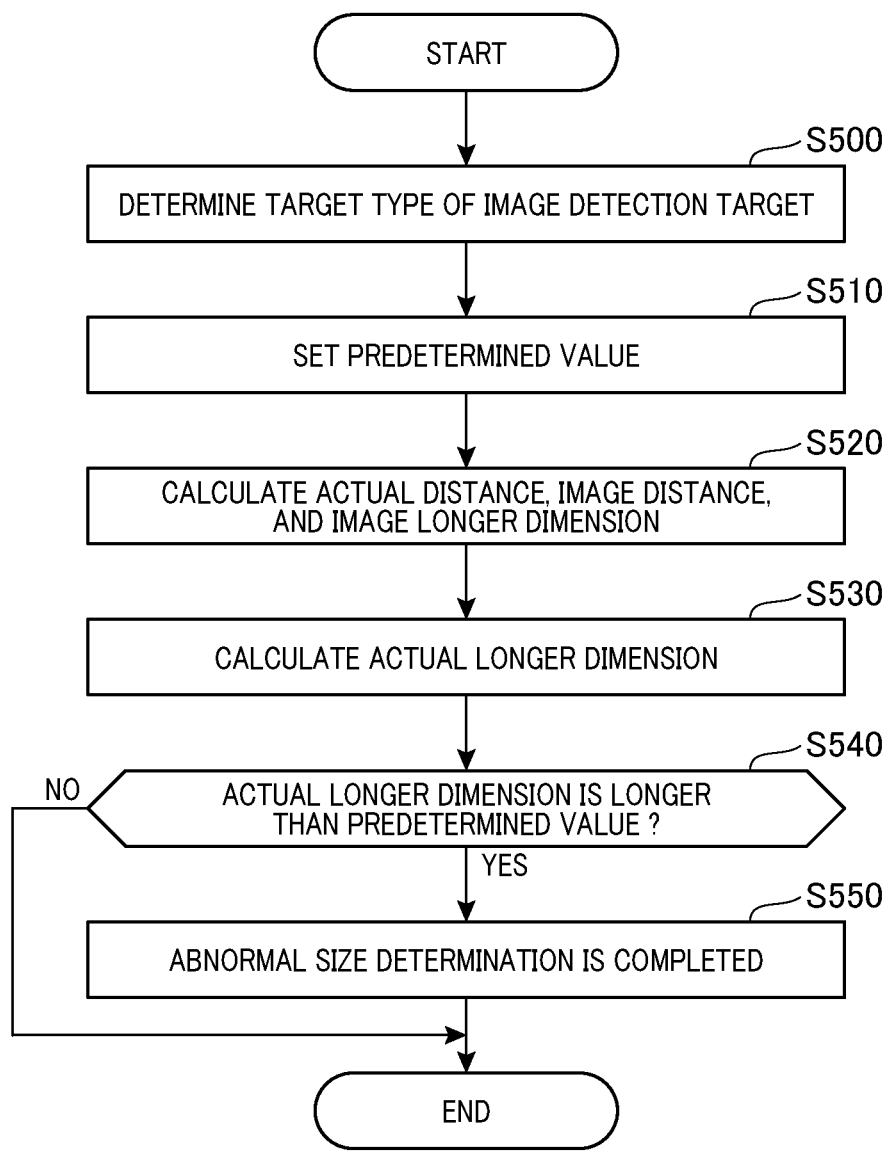

TARGET DETECTION DEVICE

CROSS-REFERENCE TO RELATED APPLICATIONS

This application is a national stage application of PCT Application No. PCT/JP2017/027126, filed on Jul. 26, 2017, which claims priority to Japanese Patent Application No. 2016-149673 filed on Jul. 29, 2016 and Japanese Patent Application No. 2017-044243 filed on Mar. 8, 2017, the contents of which are incorporated herein by reference.

TECHNICAL FIELD

The present disclosure relates to a target detection device for detecting a target.

BACKGROUND ART

A vehicle collision avoidance system is required to accurately detect a target such as another vehicle or a pedestrian. Thus, a configuration has been proposed in which a target is detected using a radar and an image sensor (see Patent Literature 1). Specifically, a target is independently detected by each of the radar and the image sensor, and when a positional relationship between the targets satisfies a determination criterion, it is determined that the targets are an identical target (termed fusion determination hereinafter).

CITATION LIST

Patent Literature

[PTL 1] JP 2014-122873 A

SUMMARY OF THE INVENTION

In Patent Literature 1, an image detection target is detected by analyzing an image signal transmitted from a monocular camera and performing a matching process using a preregistered target model for a specific target. The specific target is mainly a vehicle or a pedestrian with which a collision is to be avoided. In this case, for example, when the matching process is performed with respect to an image including a pedestrian crossing, the pedestrian crossing may be erroneously detected as a silhouette in a specific direction of the target model for a specific target. In such a case, for example, if a radar detects a target such as a manhole or a road sign near a position of the erroneously detected image detection target, these targets may be erroneously determined to be an identical target.

The present disclosure has been made to solve the above problem, and has a main object of providing a target detection device capable of preventing erroneous determination regarding a specific target that a radar detection target and an image detection target are an identical target.

The present disclosure is a target detection device for acquiring reflection information from a radar device and acquiring image information from a monocular camera, the radar device transmitting a probe wave toward an area ahead of a vehicle in its direction of travel and receiving a reflected wave reflected by a target, the reflection information being based on the reflected wave, the monocular camera capturing an image of the area ahead of the vehicle in its direction of travel, the target detection device including: a radar detection target position detecting section that detects a position of a radar detection target which is a target detected on the basis of the reflection information; an image detection target position detecting section that detects, on the basis of the image information, a specific target that is likely to collide with the vehicle, and detects a position of an image detection target which is the detected specific target; an identical target provisional determination section that when a positional relationship between the radar detection target and the image detection target becomes a predetermined relationship, provisionally determines that the radar detection target and the image detection target are an identical target; a predetermined target determination section that determines whether the image detection target is a predetermined target that can be passed by the vehicle; and an identical target determination section that when the identical target provisional determination section provisionally determines that the radar detection target and the image detection target are an identical target, and the predetermined target determination section determines that the image detection target is the predetermined target, determines that the radar detection target and the image detection target are not an identical target, and when the identical target provisional determination section provisionally determines that the radar detection target and the image detection target are an identical target, and the predetermined target determination section determines that the image detection target is not the predetermined target, determines that the radar detection target and the image detection target are an identical target.

With the above configuration, when the positional relationship between the radar detection target and the image detection target becomes the predetermined relationship, the identical target provisional determination section provisionally determines that the radar detection target and the image detection target are an identical target. In some cases, a specific target that is likely to collide with the vehicle is not accurately detected as the image detection target, and a predetermined type of target that can be passed by the vehicle is erroneously detected as the specific target. In such a case, if it is determined, on the basis of position information on the erroneously detected image detection target, that the radar detection target and the image detection target are an identical target, accuracy of the identical target determination regarding the specific target is reduced.

As a countermeasure against this, the predetermined target determination section is included. When the identical target provisional determination section provisionally determines that the radar detection target and the image detection target are an identical target, and even though the predetermined target determination section previously determined that the image detection target is the predetermined type of target, the identical target determination section determines that the radar detection target and the image detection target are not an identical target. This prevents a situation where a predetermined type of target that can be passed by the vehicle is erroneously detected as the specific target and the identical target determination regarding the specific target is performed on the basis of the erroneously detected image detection target. On the other hand, when the identical target provisional determination section provisionally determines that the radar detection target and the image detection target are an identical target, and even though the predetermined target determination section previously determined that the image detection target is not the predetermined type of target, the identical target determination section determines that the radar detection target and the image detection target are an identical target. When the image detection target is not the predetermined target, the specific target is more likely to have been properly detected as the image detection target. Thus, accuracy of the identical target determination regarding the specific target can be improved.

BRIEF DESCRIPTION OF THE DRAWINGS

The above object and other objects, features, and advantages of the present disclosure will be clarified by the following detailed description with reference to the accompanying drawings, wherein:

FIG. 6 shows a subroutine process of step S170 shown in FIG. 3;

FIG. 7 shows a flowchart for control performed by a detection ECU according to another embodiment; and FIG. 8 shows a subroutine process of step S375 shown in FIG. 7.

DESCRIPTION OF THE EMBODIMENTS

Figure 1:
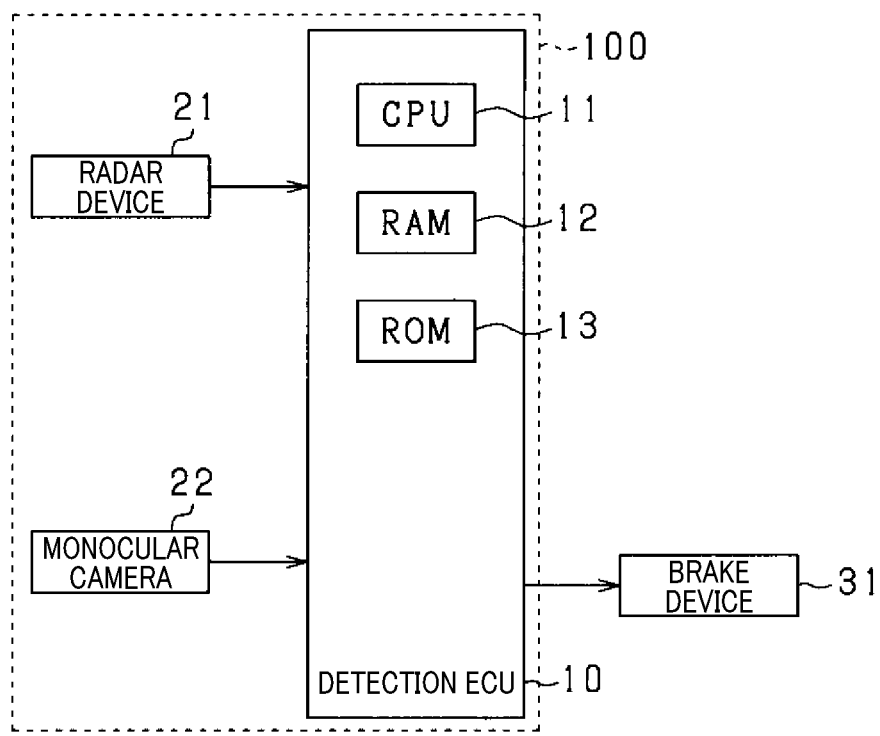
FIG. 1 is a schematic structure diagram of a travel support device according to the present embodiment.

A travel support device 100 illustrated in FIG. 1 is mounted in a vehicle (own vehicle), detects a target that is present around the own vehicle, such as in an area ahead of the own vehicle in its direction of travel, and performs travel support control. The travel support control functions as a PCS system that performs control to avoid a collision with the target or to mitigate damage from the collision.

In FIG. 1, the travel support device 100 is constituted by a detection ECU 10, a radar device 21, and a monocular camera 22.

The radar device 21 is, for example, a publicly known millimeter wave radar that transmits a high-frequency signal in a millimeter wave band, and is mounted at a front end portion of the own vehicle. The radar device 21 detects a position of a target (termed a radar detection target) within a detection range which is a region in a predetermined detection angle in which a target is detectable. Specifically, the radar device 21 transmits probe waves at predetermined time intervals, and receives reflected waves by a plurality of antennas. A distance to the radar detection target is calculated on the basis of a time at which the probe waves are transmitted and a time at which the reflected waves are received. Furthermore, the radar device 21 calculates a relative speed on the basis of a frequency of the reflected waves reflected by the radar detection target. The frequency is changed due to the Doppler effect. In addition, the radar device 21 calculates an azimuth of the radar detection target on the basis of a phase difference of the reflected waves received with the plurality of antennas. When a position and an azimuth of a radar detection target are obtained, a relative position of the radar detection target with respect to the own vehicle can be determined. The radar device 21 performs the transmission of probe waves, the reception of reflected waves, and the calculation of a reflection position and a relative speed at predetermined time intervals, and transmits the calculated reflection position and relative speed to the detection ECU 10.

The monocular camera 22 is mounted at a predetermined height in a center in a vehicle width direction of the own vehicle, and captures, from a bird's-eye view, an image of a region extending over a predetermined angle range toward the area ahead of the own vehicle. The monocular camera 22 then transmits the captured image information to the detection ECU 10.

The radar device 21 and the monocular camera 22 are connected to the detection ECU 10. The detection ECU 10 is a computer including a CPU 11, RAM 12, ROM 13, I/O interface, and the like. The CPU 11 executes programs installed in the ROM 13, so that the detection ECU 10 performs various functions. Thus, the detection ECU 10 can function as a target detection device, and therefore corresponds to a radar detection target position detecting section, an image detection target position detecting section, an identical target provisional determination section, a predetermined target determination section, an identical target determination section, a count section, a flow computing section, a road sign determination section, and a collision prevention section.

In the present embodiment, a plurality of programs are installed in the ROM 13. Specifically, the programs include a pattern matching program, an identical target provisional determination program, and a travel support program.

The pattern matching program detects luminance in the image information transmitted from the monocular camera 22, and on the basis of the detected luminance, performs pattern matching with a prestored target template regarding a specific target. The target template regarding a specific target is a target template regarding at least one of a vehicle and a pedestrian. Specifically, in the present embodiment, the pattern matching program is a process of detecting at least one of a vehicle and a pedestrian from the image information.

Specifically, the pattern matching is performed as described below. The target template regarding a specific target is moved in a longitudinal direction and a lateral direction little by little in a predetermined order on an image, and the pattern matching is performed at each position. The pattern matching at each position indicates a determination process of calculating a degree of matching between luminance at each position in the image and luminance in the target template regarding a specific target, and determining whether the calculated degree of matching is greater than a reference value. In the determination process, when it is determined that the degree of matching between the luminance at each position in the image and the luminance in the target template regarding a specific target is greater than the reference value, it is determined that the image includes a point having luminance information that matches luminance information in the target template regarding a specific target, and the point is detected as an image detection target.

The identical target provisional determination program provisionally determines, on the basis of information on the radar detection target and information on the image detection target, whether the radar detection target and the image detection target indicate an identical target. Specifically, a radar detection target position and an image detection target position located close to each other are determined to be based on the same target and are associated with each other. The radar detection target position is a position acquired from the radar detection target, and the image detection target position is a position acquired from the image detection target detected by the pattern matching.

Figure 2:
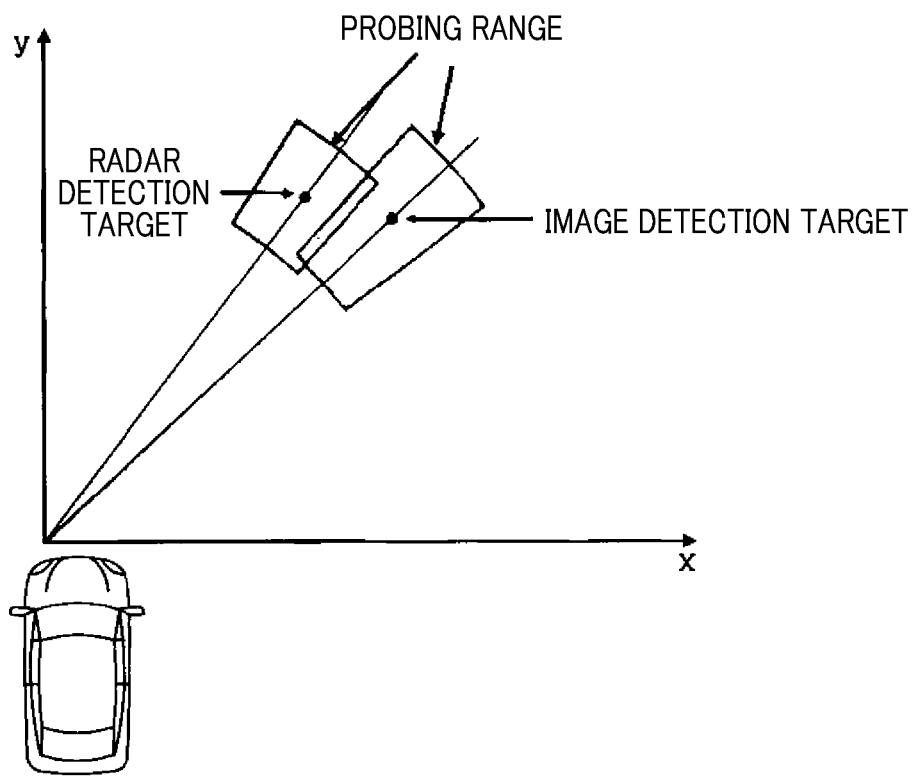
FIG. 2 illustrates a state where it is determined that a radar detection target and an image detection target are an identical target.

Specifically, as illustrated in FIG. 2, an XY plane is formed where an X-axis represents the vehicle width direction of the own vehicle and a Y-axis represents a vehicle length direction of the own vehicle. Furthermore, an error range in XY coordinates is formed around each of a detected image detection target position and a detected radar detection target position. Then, it is determined whether the error range around the radar detection target position (termed a radar probing range hereinafter) overlaps the error range around the image detection target position (termed an image probing range hereinafter). Methods of setting the radar probing range and the image probing range are well known, and thus are not described in detail. When the radar probing range overlaps the image probing range, a target is highly likely to be actually present within the radar probing range. The state where a position of a target has been accurately acquired by the radar device 21 and the monocular camera 22 is termed a fusion state. When a target is determined to be in the fusion state, it is provisionally determined that the target (termed an identical target hereinafter) is present at the position.

The travel support program will be described later.

When the detection ECU 10 with such a configuration acquires, from the monocular camera 22, an image including a pedestrian crossing or a road surface pattern, and the pattern matching with the target template is performed with respect to the acquired image, the pedestrian crossing or the road surface pattern may be erroneously detected as a silhouette in a specific direction of the target template regarding a specific target. In this case, for example, if the radar device 21 detects a target such as a manhole or a road sign near a position of the erroneously detected image detection target, these targets may be erroneously determined to be an identical target.

On the other hand, it is difficult for the detection ECU 10 to determine, only on the basis of the information acquired from the radar device 21, what type of target the radar detection target is. Accordingly, a target is detected as the radar detection target without determining a type of the target. Thus, for example, a road sign may have been detected as the radar detection target. In this case, if a specific target that is present near the road sign is detected as the image detection target on the basis of the image information, the image detection target and the radar detection target may be erroneously determined to be an identical target.

As a countermeasure against this, the ROM 13 further includes a predetermined target determination program, a road sign determination program, and an identical target determination program.

The predetermined target determination program determines whether a predetermined type of target (termed a predetermined target hereinafter) is present within the image probing range in the image information. The predetermined target is a target that can be passed by the vehicle and may be erroneously detected as the image detection target by the pattern matching with the target template regarding a specific target. The present embodiment assumes the predetermined target to be a pedestrian crossing or a road surface pattern. In this case, different determination methods are used to determine whether a pedestrian crossing is present within the image probing range and to determine whether a road surface pattern is present within the image probing range. Thus, the predetermined target determination program individually performs each determination.

The following determination method is used to determine whether a pedestrian crossing is present within the image probing range in the image information. Many of pedestrian crossings are regions crossing a roadway in each of which a plurality of white lines are intermittently drawn. Accordingly, luminance is expected to be detected in a predetermined pattern at a point where a pedestrian crossing is present in the image information. In consideration of this, when a point where luminance changes in a predetermined pattern is present within the image probing range in the image information, the number of changes in the luminance is counted. Then, when the counted number of changes in the luminance is greater than a predetermined number, it is determined that a pedestrian crossing is present within the image probing range and the pedestrian crossing may have been detected as the image detection target.

The following determination method is used to determine whether a road surface pattern is present within the image probing range in the image information. Besides the pedestrian crossings, for example, road surface patterns such as characters or arrows drawn in white lines are present on the road. Such road surface patterns are expected to have a more complicated structure than white lines dividing lanes or the white lines constituting the pedestrian crossings. Thus, luminance of the road surface patterns having a complicated structure is expected not to change in a predetermined pattern, unlike the pedestrian crossings. Accordingly, it is difficult to detect a road surface pattern on the basis of a change in luminance. For this reason, instead of directly identifying a road surface pattern, it is determined whether only a road surface is present within the image probing range. When only a road surface is present within the image probing range, it is determined that a road surface pattern may have been detected as the image detection target.

Specifically, an optical flow within the image probing range (i.e., of the image detection target) is computed, and similarity between the computed optical flow and a prestored optical flow model for a road surface is determined. The optical flow is obtained by detecting a plurality of boundary points constituting a boundary line that shows occurrence of changes in luminance in an image, and indicating the detected boundary points as a motion vector. The optical flow varies depending on whether the image detection target is a two-dimensional object or a three-dimensional object. Accordingly, by detecting many boundary points and indicating a motion vector of all the boundary points, it is possible to accurately determine whether the image detection target is a two-dimensional object or a three-dimensional object. Thus, when a degree of similarity between the computed optical flow within the image probing range and the prestored optical flow model for a road surface is higher than a threshold, it is determined that a road surface pattern is present within the image probing range and the road surface pattern may have been detected as the image detection target.

The road sign determination program determines, on the basis of the image information acquired from the monocular camera 22, whether a road sign is present within the radar probing range. Specifically, the road sign determination program comprehensively detects luminance in a range corresponding to the radar probing range in the image information. Then, the road sign determination program moves a target template regarding a road sign in a predetermined order, and calculates a degree of matching between luminance at each position and luminance in the target template regarding a road sign. When the road sign determination program determines that a point where the calculated degree of matching is greater than a reference value is present, the road sign determination program determines that a road sign is present within the radar probing range and the road sign may have been detected as the radar detection target.

With regard to the identical target determination program, when a position of the target has been accurately acquired by the radar device 21 and the monocular camera 22, the identical target provisional determination program provisionally determines that an identical target is present, and the predetermined target determination program determines that a predetermined target may have been detected as the image detection target, the identical target determination program determines that the radar detection target and the image detection target are not an identical target. Alternatively, when a position of the target has been accurately acquired by the radar device 21 and the monocular camera 22, the identical target provisional determination program provisionally determines that an identical target is present, and the road sign determination program determines that a road sign may have been detected as the radar detection target, the identical target determination program determines that the radar detection target and the image detection target are not an identical target.

On the other hand, when a position of the target has been accurately acquired by the radar device 21 and the monocular camera 22, the identical target provisional determination program provisionally determines that an identical target is present, the predetermined target determination program determines that a predetermined target is unlikely to have been detected as the image detection target, and the road sign determination program determines that a road sign is unlikely to have been detected as the radar detection target, the identical target determination program determines that the radar detection target and the image detection target are an identical target.

In the present embodiment, on condition that the identical target determination program determines that the radar detection target and the image detection target are an identical target, the travel support program performs a prescribed travel support process on the basis of a positional relationship between the own vehicle and the identical target.

In the present embodiment, the travel support process corresponds to a braking process (corresponding to prevention control) of braking the own vehicle when the own vehicle is likely to collide with a specific target that is present ahead of the own vehicle. Thus, the own vehicle includes a brake device 31 as a safety device that is driven by a control command from the detection ECU 10.

The brake device 31 is a braking device that brakes the own vehicle. For example, when the detection ECU 10 calculates time-to-collision (TTC) which is time until an identical target collides with the own vehicle, and determines that the time to collision is shorter than a predetermined time and the own vehicle is highly likely to collide with the target, the brake device 31 is activated by a control command from the detection ECU 10. Specifically, the brake device 31 increases braking force for a braking operation performed by a driver (brake assist function) or performs automatic braking when no braking operation has been performed by the driver (automatic brake function).

Figure 3:
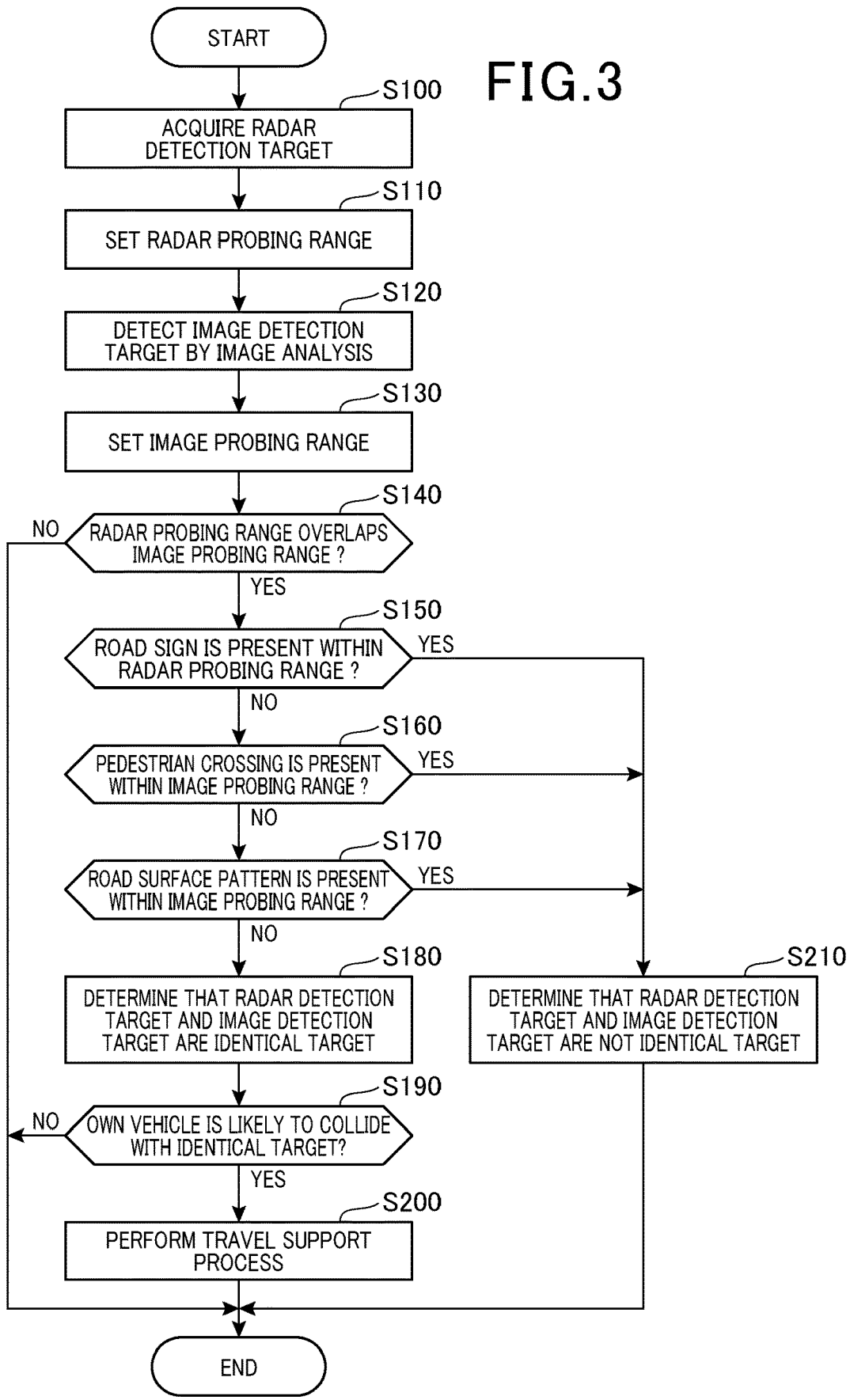
FIG. 3 shows a flowchart for control performed by a detection ECU according to the present embodiment.

In the present embodiment, the detection ECU 10 performs identical target determination control (described later) shown in FIG. 3. The identical target determination control shown in FIG. 3 is repeatedly performed by the detection ECU 10 at predetermined time intervals, while the detection ECU 10 is powered on.

First, at step S100, position information on a radar detection target detected by the radar device 21 is acquired. At step S110, a radar probing range is set around a position indicated by the acquired position information on the radar detection target.

At step S120, an image detection target is detected on the basis of the image information acquired from the monocular camera 22. At step S130, an image probing range is set around a position indicated by position information on the detected image detection target.

At step S140, it is determined whether the set radar probing range overlaps the set image probing range to provisionally determine whether the radar detection target and the image detection target are an identical target. When it is determined that the radar probing range does not overlap the image probing range and is thus determined that the radar detection target and the image detection target are not an identical target (NO at S140), this control ends. When it is determined that the radar probing range overlaps the image probing range and is thus provisionally determined that the radar detection target and the image detection target are an identical target (YES at S140), the process proceeds to step S150.

At step S150, it is determined, on the basis of the image information acquired from the monocular camera 22, whether a road sign is present within the radar probing range. When it is determined that no road sign is present within the radar probing range (NO at S150), the process proceeds to step S160. At step S160, it is determined whether a pedestrian crossing is present within the image probing range in the image information. When it is determined that no pedestrian crossing is present within the image probing range in the image information (NO at S160), the process proceeds to step S170. At step S170, it is determined whether a road surface pattern is present within the image probing range in the image information. When it is determined that no road surface pattern is present within the image probing range in the image information (NO at S170), the process proceeds to step S180. At step S180, it is determined that the radar detection target and the image detection target are an identical target, and the process proceeds to step S190.

At step S190, it is determined whether the identical target determined at step S180 is likely to collide with the own vehicle. When it is determined that the identical target is unlikely to collide with the own vehicle (NO at S190), this control ends at this point. When it is determined that the identical target is likely to collide with the own vehicle (YES at S190), the process proceeds to step S200. Then, the braking process (prescribed travel support process) is performed by the brake device 31, and this control ends.

On the other hand, when it is determined that a road sign is present within the radar probing range (YES at S150), when it is determined that a pedestrian crossing is present within the image probing range in the image information (YES at S160), and when it is determined that a road surface pattern is present within the image probing range in the image information (YES at S170), the process proceeds to step S210. At step S210, it is determined that the radar detection target and the image detection target are not an identical target, and this control ends.

Figure 4:
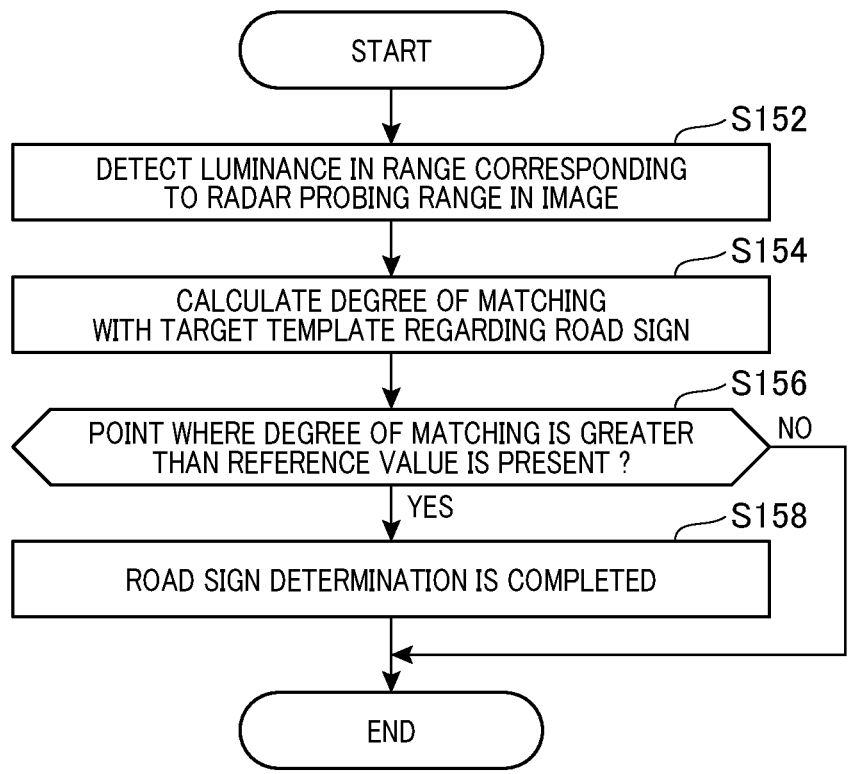
FIG. 4 shows a subroutine process of step S150 shown in FIG. 3.

With reference to FIG. 4, a description will be given of road sign determination control which is a subroutine process corresponding to step S150 shown in FIG. 3. The road sign determination control is performed by the ECU 10.

First, at step S152, luminance in a range corresponding to the radar probing range in the image information is comprehensively detected. At step S154, the target template regarding a road sign is moved in a predetermined order, and a degree of matching between luminance at each position and luminance in the target template is calculated.

At step S156, it is determined whether a point where the degree of matching calculated at step S154 is greater than a reference value is present. When it is determined that a point where the degree of matching with the luminance in the target template is greater than the reference value is not present (NO at S156), this control ends. When it is determined that a point where the degree of matching with the luminance in the target template is greater than the reference value is present (YES at S156), the process proceeds to step S158. Then, it is determined that a road sign is present within the radar probing range and the road sign may have been detected as the radar detection target, and this control ends.

Figure 5:
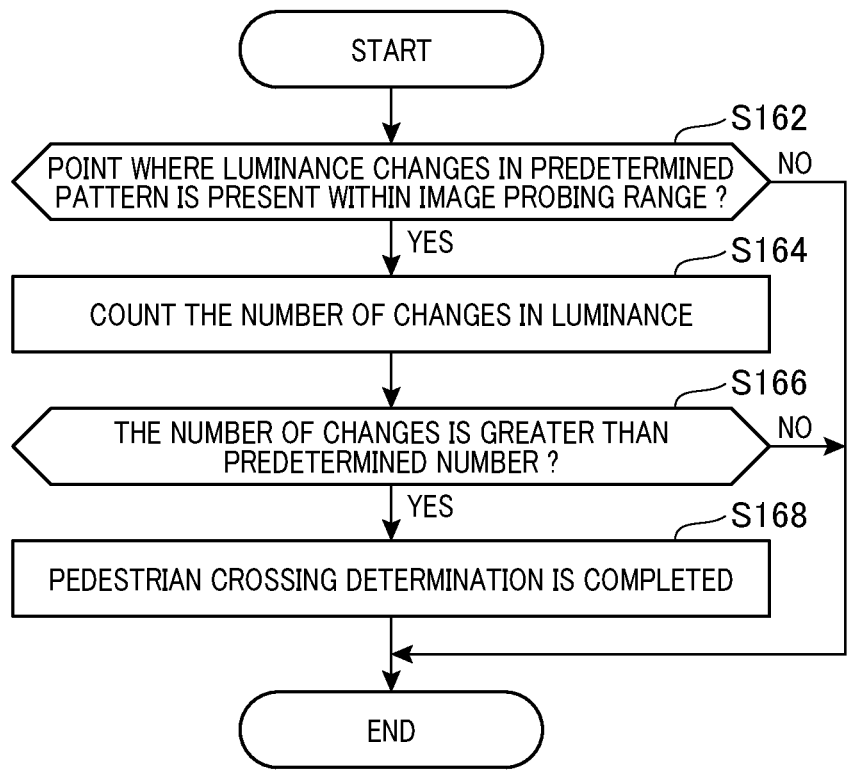
FIG. 5 shows a subroutine process of step S160 shown in FIG. 3.

With reference to FIG. 5, a description will be given of pedestrian crossing determination control which is a sub-routine process corresponding to step S160 shown in FIG. 3. The pedestrian crossing determination control is performed by the ECU 10.

First, at step S162, it is determined whether a point where luminance changes in a predetermined pattern corresponding to a pedestrian crossing is present within the image probing range. When it is determined that a point where luminance changes in the predetermined pattern is not present within the image probing range (NO at S162), this control ends. When it is determined that a point where luminance changes in the predetermined pattern is present within the image probing range (YES at S162), the process proceeds to step S164.

At step S164, the number of changes in the luminance at the point where the luminance changes is counted. At step S166, it is determined whether the counted number of changes in the luminance is greater than a predetermined number. When it is determined that the counted number of changes in the luminance is not greater than the predetermined number (NO at S166), this control ends. When it is determined that the counted number of changes in the luminance is greater than the predetermined number (YES at S166), the process proceeds to step S168. Then, it is determined that a pedestrian crossing is present within the image probing range and the pedestrian crossing may have been detected as the image detection target, and this control ends.

With reference to FIG. 6, a description will be given of road surface pattern determination control which is a sub-routine process corresponding to step S170 shown in FIG. 3. The road surface pattern determination control is performed by the ECU 10.

At step S172, an optical flow within the image probing range is computed. At step S174, the prestored optical flow model for a road surface is read.

At step S176, it is determined whether a degree of similarity between the computed optical flow within the image probing range and the read optical flow model for a road surface is greater than a threshold. When it is determined that the degree of similarity between the computed optical flow within the image probing range and the read optical flow model for a road surface is not greater than the threshold (NO at S176), this control ends at this point. When it is determined that the degree of similarity between the computed optical flow within the image probing range and the read optical flow model for a road surface is greater than the threshold (YES at S176), the process proceeds to step S178. At step S178, it is determined that a road surface pattern is present within the image probing range and the road surface pattern may have been detected as the image detection target, and this control ends.

With the above configuration, the present embodiment yields the following effects.

When a position of the target has been accurately acquired by the radar device 21 and the monocular camera 22, it is provisionally determined that an identical target is present, and it is determined that a predetermined target may have been detected as the image detection target, the target detection device of the present embodiment determines that the radar detection target and the image detection target are not an identical target. Alternatively, when a position of the target has been accurately acquired by the radar device 21 and the monocular camera 22, it is provisionally determined that an identical target is present, and it is determined that a road sign may have been detected as the radar detection target, the target detection device of the present embodiment determines that the radar detection target and the image detection target are not an identical target. Thus, it can be determined that the radar detection target and the image detection target are not an identical target in a situation where a predetermined type of target that can be passed by the vehicle may have been erroneously detected as the image detection target or a situation where a road sign may have been detected as the radar detection target.

On the other hand, when a position of the target has been accurately acquired by the radar device 21 and the monocular camera 22, it is provisionally determined that an identical target is present, it is determined that no predetermined target is present within the image probing range in the image information, and it is determined that no road sign is present within the radar probing range, the target detection device of the present embodiment determines that the radar detection target and the image detection target are an identical target. When no predetermined target is present within the image probing range, the specific target is more likely to have been properly detected as the image detection target. Furthermore, when it is determined that no road sign is present within the radar probing range, the specific target is more likely to have been properly detected as the radar detection target. Accordingly, the identical target determination can be performed in a situation where the specific target is highly likely to have been properly detected as both the radar detection target and the image detection target. Thus, accuracy of the identical target determination regarding the specific target can be improved.

The predetermined target includes a pedestrian crossing. Accordingly, even when a pedestrian crossing is detected as the image detection target and then it is provisionally determined that the radar detection target and the image detection target are an identical target, it can be determined that the pedestrian crossing may have been detected as the image detection target. Thus, when it is determined that the pedestrian crossing may have been detected as the image detection target, it can be determined that the radar detection target and the image detection target are not an identical target.

When a point where luminance changes in a predetermined pattern is present within the image probing range in the image information, the number of changes in the luminance is counted. Then, when the counted number of changes in the luminance is greater than the predetermined number, it can be determined that a pedestrian crossing is present within the image probing range and the pedestrian crossing may have been detected as the image detection target.

The predetermined target includes a road surface pattern. Accordingly, even when a road surface pattern is detected as the image detection target and then it is provisionally determined that the radar detection target and the image detection target are an identical target, it can be determined that the road surface pattern may have been detected as the image detection target. Thus, when it is determined that the road surface pattern may have been detected as the image detection target, it can be determined that the radar detection target and the image detection target are not an identical target.

When the degree of similarity between the optical flow of the image detection target in the image information and the prestored optical flow model for a road surface is higher than the threshold, it can be determined that a road surface pattern is present within the image probing range and the road surface pattern may have been detected as the image detection target.

The travel support process is performed on condition that it is determined that the radar detection target and the image detection target are an identical target. Accordingly, the travel support process can be performed as appropriate in a situation where a target determined to be the identical target is highly likely to be the specific target.

A target that is likely to collide with a travelling vehicle is mainly a mobile object such as a pedestrian or a vehicle that is moving. Accordingly, when a pedestrian or a vehicle that is present ahead of the own vehicle in its direction of travel is detected as the image detection target on the basis of the image information, and a radar detection target whose positional relationship with the detected image detection target is a predetermined relationship is acquired, position information on the image detection target can be acquired with high accuracy on the basis of position information on the radar detection target. Specifically, movement of a human being or a vehicle that is present ahead of the own vehicle can be determined with high accuracy.

The above embodiment can be implemented with modifications as described below.

In the above embodiment, the target template regarding a specific target is the target template regarding at least one of a vehicle and a pedestrian. In this regard, a bicycle may be added so that the target template regarding a specific target is a template regarding at least one of a vehicle, a pedestrian, and a bicycle.

In the above embodiment, the travel support process corresponds to the braking process of braking the own vehicle by the brake device 31 when the own vehicle is likely to collide with the specific target that is present ahead of the own vehicle. In this regard, the own vehicle may include an electric power steering and perform a travel support process of controlling the electric power steering in a direction to avoid a collision with the identical target when the own vehicle is likely to collide with the specific target that is present ahead of the own vehicle.

In the above embodiment, the road sign determination program determines, on the basis of the image information acquired from the monocular camera 22, whether a road sign is present within the radar probing range. The determination by the road sign determination program does not necessarily need to be performed. Such a configuration also achieves actions and effects similar to those of the above embodiment.

In the above embodiment, when the radar probing range overlaps the image probing range, the identical target provisional determination program provisionally determines that the radar detection target and the image detection target are an identical target. In this regard, the radar probing range does not necessarily need to be formed. The identical target provisional determination program may provisionally determine that the radar detection target and the image detection target are an identical target, when the radar detection target is included within the image probing range.

In the above embodiment, when a position of the target has been accurately acquired by the radar device 21 and the monocular camera 22, and the identical target provisional determination program provisionally determines that an identical target is present, the identical target determination program determines, on the basis of the determination result of the predetermined target determination program or the road sign determination program, whether the radar detection target and the image detection target are an identical target. In this regard, the identical target provisional determination program may be deleted and an identical target determination confirmation program may be added. In this configuration, the identical target determination program performs the same determination process as the identical target provisional determination program according to the above embodiment. In this case, when a position of the target has been accurately acquired by the radar device 21 and the monocular camera 22, and the identical target determination program determines that an identical target is present, the identical target determination confirmation program confirms or denies, on the basis of the determination result of the predetermined target determination program or the road sign determination program, the determination result of the identical target determination program that the radar detection target and the image detection target are an identical target. Such a configuration also achieves actions and effects similar to those of the above embodiment.

In the above embodiment, it is determined, on the basis of the image information acquired from the monocular camera 22, whether a road sign is present within the radar probing range. In this regard, a pedestrian bridge and a manhole may be added as objects used for the determination. In some cases, not only a road sign but also a pedestrian bridge or a manhole is detected as the radar detection target. In such a case, if a specific target that is present near the radar detection target is detected as the image detection target, the radar detection target and the image detection target may be erroneously determined to be an identical target. As a countermeasure against this, it is determined, on the basis of the image information acquired from the monocular camera 22, whether at least one of a road sign, a pedestrian bridge, and a manhole is present within the radar probing range. This determination process can further increase the possibility that the specific target has been properly detected as the radar detection target. Thus, accuracy of the identical target determination regarding the specific target can be improved.

In the above embodiment, the predetermined target includes a pedestrian crossing and a road surface pattern. In this regard, in addition to the pedestrian crossing and the road surface pattern, the predetermined target may include a manhole.

(1) In the above embodiment, it has been described that when an image including a pedestrian crossing or a road surface pattern is acquired from the monocular camera 22, and the pattern matching with the target template is performed with respect to the acquired image, the pedestrian crossing or the road surface pattern may be erroneously detected as a silhouette in a specific direction of the target template regarding a specific target. However, an object that may be erroneously detected is not limited to a pedestrian crossing or a road surface pattern.

In the pattern matching, when an image includes a point where a degree of matching with luminance in the target template regarding a specific target is greater than a reference value, the point is detected as the image detection target. In this case, a height or a length in the vehicle width direction (termed a lateral width hereinafter) of the detected image detection target is not considered. Thus, when an image includes a tree planted in a median strip or a sidewalk, and it is determined that a degree of matching between luminance at a position of the tree and luminance in the target template regarding a pedestrian is greater than a reference value, the tree planted in the median strip or the sidewalk may be erroneously detected as a pedestrian, even though the tree and the pedestrian greatly differ from each other in height. Alternatively, when an image includes a viaduct, and it is determined that a degree of matching between luminance at a position of the viaduct and luminance in the target template regarding a vehicle is greater than a reference value, the viaduct may be erroneously detected as a vehicle, even though the viaduct and the vehicle greatly differ from each other in lateral width.

As a countermeasure against this, the ROM 13 according to the above embodiment may further include a target type determination program, a dimension calculation program, or an abnormal size determination program. In this another embodiment, the target template regarding a specific target is the template regarding at least one of a vehicle, a pedestrian, and a bicycle.

When an image detection target is detected by the pattern matching program, the target type determination program determines a type (i.e., a vehicle, a pedestrian, or a bicycle) of the image detection target, depending on which one of the target template regarding a vehicle, the target template regarding a pedestrian, and the target template regarding a bicycle has luminance whose degree of matching with luminance at a position where the image detection target is detected in the image is higher than a reference value. For example, when a degree of matching of luminance in the target template regarding a vehicle with the luminance at the position where the image detection target is detected in the image is higher than the reference value, the target type determination program determines that the image detection target is a vehicle. Thus, the target type determination program corresponds to a type determination section.

Hereinafter, in a type determined by the target type determination program, a lateral width (or a total length) or a height, whichever is expected to be longer, is termed a longer dimension. On the basis of the type of the image detection target determined by the target type determination program, the dimension calculation program determines a longer dimension to be calculated (determines whether the longer dimension is to be a lateral width (or a total length) or a height), and calculates the longer dimension of the image detection target in real space (termed an actual longer dimension hereinafter). Thus, the dimension calculation program corresponds to a longer dimension calculation section.

The dimension calculation program will be described in more detail below. When the target type determination program determines that the image detection target is a vehicle, since many vehicles have a lateral width greater than their height, the longer dimension is determined to be lateral width, and the dimension calculation program calculates the lateral width of the image detection target in real space. When the target type determination program determines that the image detection target is a pedestrian, since pedestrians have a height greater than their lateral width, the longer dimension is determined to be height, and the dimension calculation program calculates the height of the image detection target in real space. When the target type determination program determines that the image detection target is a bicycle, a relationship between its lateral width and height varies depending on a direction in which the bicycle is directed. Thus, when the bicycle is a bicycle that is moving in a direction parallel to the direction of travel of the own vehicle (termed a longitudinally directed bicycle hereinafter), since the bicycle has a height greater than its lateral width, the longer dimension is determined to be height, and the dimension calculation program calculates the height of the image detection target in real space. On the other hand, when the bicycle is a bicycle that is moving in a direction orthogonal to the direction of travel of the own vehicle (termed a laterally directed bicycle hereinafter), since the bicycle has a total length greater than its height, the longer dimension is determined to be total length, and the dimension calculation program calculates the total length of the image detection target in real space.

A specific method of calculating the longer dimension of the image detection target in real space will be described below.

A value obtained by dividing a distance from a lens of the monocular camera 22 to the image detection target in real space (termed an actual distance hereinafter) by a distance from the lens of the monocular camera 22 to the image detection target in the image (termed an image distance hereinafter) is equal to a value obtained by dividing an actual longer dimension by a longer dimension of the image detection target in the image (termed an image longer dimension hereinafter). On the basis of this relationship, an equation for calculating the actual longer dimension represented by equation (1) is derived.

$$\text{Actual longer dimension} = (\text{Actual distance} \times \text{Image longer dimension})/\text{Image distance} \quad (1)$$

In this case, as the actual distance, a distance to the image detection target in real space is calculated by determining how far below (or above) a center in the longitudinal direction of the image a position of the image detection target in the image is. The image longer dimension is obtained by calculating, as the number of pixels, a height or width intended to be calculated in the image detection target, and multiplying the calculated number of pixels by the reciprocal of resolution of the image. The image distance is obtained by calculating, as the number of pixels, a distance to the image detection target, and multiplying the calculated number of pixels by the reciprocal of resolution of the image.

In this another embodiment, when a length of the actual longer dimension is calculated in metric units, the resolution of the image is defined as the number of pixels per meter. Thus, the height or width of the image detection target in the image can be converted into metric units by multiplying, by the reciprocal of the resolution, the height or width intended to be calculated in the image detection target that is calculated as the number of pixels. Similarly, the distance to the image detection target in the image can be converted into metric units by multiplying, by the reciprocal of the resolution, the distance to the image detection target calculated as the number of pixels. That is, the units of the image longer dimension and the image distance can be unified as meter.

The abnormal size determination program determines whether a size of the image detection target is an abnormal size by determining whether the actual dimension calculated by the dimension calculation program is greater than a determination value. Thus, the abnormal size determination program corresponds to an abnormal size determination section.

In this another embodiment, the determination value is set to be longer by a predetermined amount (a value reflecting a detection error) than an upper limit value of a size expected when the image detection target is the specific target. More specifically, when the target type determination program determines that the image detection target is a vehicle, the determination value is set to be longer by a predetermined amount than an upper limit value of a lateral width expected for the vehicle (e.g., when the upper limit value is 3.5 m, the determination value is set to 4.5 m). When the target type determination program determines that the image detection target is a pedestrian, the determination value is set to be longer by a predetermined amount than an upper limit value of a height expected for the pedestrian (e.g., when the upper limit value is 2.5 m, the determination value is set to 3.5 m). When the target type determination program determines that the image detection target is a laterally directed bicycle, the determination value is set to be longer by a predetermined amount than an upper limit value of a total length expected for the laterally directed bicycle (e.g., when the upper limit value is 2.5 m, the determination value is set to 3.5 m). When the target type determination program determines that the image detection target is a longitudinally directed bicycle, the determination value is set to be longer by a predetermined amount than an upper limit value of a height expected for the longitudinally directed bicycle (e.g., when the upper limit value is 1.5 m, the determination value is set to 3.0 m). Thus, the determination value is set to be variable depending on a type of the image detection target determined by the target type determination program.

FIG. 7 is a flowchart obtained by partially modifying the flowchart in FIG. 3. Specifically, step S375 is inserted between step S370, which corresponds to step S170, and step S380, which corresponds to step S180.

When a negative (NO) determination is made in a determination process at step S370, the process proceeds to step S375. At step S375, it is determined whether a size of the detected image detection target is the abnormal size. When it is determined that the size of the image detection target is the abnormal size (YES at S375), the process proceeds to step S410, which corresponds to step S210. When it is determined that the size of the image detection target is not the abnormal size (NO at S375), the process proceeds to step S380.

With regard to the other steps, processes at steps S300, 310, 320, 330, 340, 350, 360, 390, and 400 in FIG. 7 are the same as the processes at steps S100, 110, 120, 130, 140, 150, 160, 190, and 200 in FIG. 3, respectively.

With reference to FIG. 8, a description will be given of abnormal size determination control which is a subroutine process corresponding to step S375 shown in FIG. 7. The abnormal size determination control is performed by the ECU 10.

First, at step S500, a type of the image detection target is determined, depending on which type of the specific target, i.e., a vehicle, a pedestrian, or a bicycle, the image detection target is. At step S510, a determination value is set on the basis of the type of the target determined at step S500.

At step S520, on the basis of the image information acquired from the monocular camera 22, an actual distance and an image distance, from the lens of the monocular camera 22 to the image detection target, and a longer dimension of the image detection target in the image are calculated. At step S530, on the basis of the actual distance, the image distance, and the image longer dimension calculated at step S520, an actual longer dimension of the image detection target in real space is calculated.

At step S540, it is determined whether the actual longer dimension calculated at step S530 is greater than the determination value set at step S510. When it is determined that the actual longer dimension is greater than the determination value (YES at S540), the process proceeds to step S550. Then, it is determined that the size of the image detection target is greater than the size of the determined target type and thus is the abnormal size, and this control ends. When it is determined that the actual longer dimension is not greater than the determination value (NO at S540), this control ends at this point.

With the above configuration, this another embodiment yields the following effects.

The abnormal size determination control according to this another embodiment makes it possible to determine that an image detection target whose size is greater than the upper limit of the size expected for a specific target is not an example of the specific target and thus to determine that the radar detection target and the image detection target are not an identical target.

For example, when a tree and a human being are compared, a greater difference lies in height than in lateral width. Furthermore, when a viaduct and a vehicle are compared, a greater difference lies in lateral width than in height. Thus, the actual longer dimension can be said to be a length that tends to be significantly different between the specific target and a target that may be erroneously detected. Therefore, when the actual longer dimension is set as an object to be determined, more accurate abnormal size determination can be performed.

The embodiment according to (1) can be implemented with modifications as described below.

The embodiment according to (1) performs the abnormal size determination by setting the actual longer dimension as the object to be determined. In this regard, the abnormal size determination may be performed by setting an actual shorter dimension as the object to be determined. A shorter dimension is a lateral width (or a total length) or a height, whichever is shorter, in a type determined by the target type determination program. The actual shorter dimension is the shorter dimension of the image detection target in real space.

In the embodiment according to (1), the road sign determination control (step S350 in FIG. 7), the pedestrian crossing determination control (step S360 in FIG. 7), and the road surface pattern determination control (step S370 in FIG. 7) are followed by the abnormal size determination control (step S375 in FIG. 7). The order of these determination control steps is not limited to the above order, but can be changed as appropriate.

In the embodiment according to (1), a type of the image detection target is determined by the target type determination program. In this regard, the target type determination program may be deleted. In this case, the dimension calculation program calculates each of a height and a lateral width (or a total length) of the image detection target in real space, and the abnormal size determination program determines whether the calculated height and lateral width of the image detection target are greater than their respective set determination values. When at least one of the height and the lateral width of the image detection target is greater than the determination value, it is determined that the size of the image detection target is the abnormal size. In this case, the determination value for the height is set to an upper limit value of a height of a target (e.g., a vehicle) whose upper limit value of the height is the largest among the types included in the specific target. Furthermore, the determination value for the lateral width is set to an upper limit value of a lateral width of a target (e.g., a vehicle) whose upper limit value of the lateral width is the largest among the types included in the specific target.

The present disclosure has been described on the basis of the embodiments, but it is understood that the present disclosure is not limited to the embodiments or the configurations. The present disclosure includes various modified examples and modifications within an equivalent range. In addition, various combinations and modes, as well as other combinations and modes, including those which include one or more additional elements, or those which include fewer elements should be considered to be in the scope and spirit of the present disclosure.

The invention claimed is:

1. A target detection device for acquiring reflection information from a radar device and acquiring an image from a monocular camera, the radar device transmitting a search wave toward an area ahead of a vehicle in its direction of travel and receiving a reflected wave reflected by a target, the reflection information being based on the reflected wave, the monocular camera capturing an image of the area ahead of the vehicle in its direction of travel, the target detection device comprising:
a radar detection target position detecting section that detects a position of a radar detection target which is a target detected on the basis of the reflection information;
an image detection target position detecting section that detects, on the basis of the image acquired from the monocular camera, a specific target that is likely to collide with the vehicle, and detects a position of an image detection target which is the detected specific target;
an identical target provisional determination section that when a positional relationship between the radar detection target and the image detection target becomes a predetermined relationship, provisionally determines that the radar detection target and the image detection target are an identical target;
a predetermined target determination section that determines whether the image detection target is a predetermined target that can be passed by the vehicle; and
an identical target determination section, in response to determining by the predetermined target determination section that the image detection target is the predetermined target after provisionally determining by the identical target provisional determination section that the radar detection target and the image detection target are an identical target, determines that the radar detection target and the image detection target are not an identical target, and in response to determining by the predetermined target determination section that the image detection target is not the predetermined target after provisionally determining by the identical target provisional determination section that the radar detection target and the image detection target are an identical target, determines that the radar detection target and the image detection target are an identical target.

2. The target detection device according to claim 1, wherein:
the predetermined target includes a pedestrian crossing.

3. The target detection device according to claim 2, further comprising:
a count section that when a point where luminance changes in a predetermined pattern is present at a position of the image detection target in the image acquired by the monocular camera, counts a number of changes in the luminance, wherein:
when the number of changes counted by the count section is greater than a predetermined number, the predetermined target determination section determines that the image detection target is the pedestrian crossing.

4. The target detection device according to claim 1, wherein:
the predetermined target includes a road surface pattern.

5. The target detection device according to claim 4, further comprising:
a flow computing section that computes an optical flow of the image detection target in the images acquired from the monocular camera, wherein:
when a degree of similarity between the optical flow computed by the flow computing section and a pre-stored optical flow model for a road surface is higher than a threshold, the predetermined target determination section determines that the image detection target is a road surface pattern.

6. The target detection device according to claim 1, further comprising:
a road sign determination section that determines, on the basis of the image acquired from the monocular camera, whether a road sign is present at a position of the radar detection target detected by the radar detection target position detecting section, wherein:
when the identical target provisional determination section provisionally determines that the radar detection target and the image detection target are an identical target, and the road sign determination section determines that the road sign is present in the image, the identical target determination section determines that the radar detection target and the image detection target are not an identical target.

7. The target detection device according to claim 1, further comprising:
a collision prevention section that on condition that the identical target determination section determines that the radar detection target and the image detection target are an identical target, performs, on the basis of a positional relationship between the vehicle and the identical target, prevention control for preventing a collision between the vehicle and the identical target.

8. The target detection device according to claim 1, wherein:
the specific target includes at least one of a vehicle and a pedestrian.

9. The target detection device according to claim 1, further comprising:
an abnormal size determination section that determines whether a size of the image detection target in real space is an abnormal size that is greater than a size expected when the image detection target is the specific target, wherein:
when the identical target provisional determination section provisionally determines that the radar detection target and the image detection target are an identical target, the predetermined target determination section determines that the image detection target is not the predetermined target, and the abnormal size determination section determines that the size of the image detection target is the abnormal size, the identical target determination section determines that the radar detection target and the image detection target are not an identical target, and when the identical target provisional determination section provisionally determines that the radar detection target and the image detection target are an identical target, the predetermined target determination section determines that the image detection target is not the predetermined target, and the abnormal size determination section determines that the size of the image detection target is not the abnormal size, the identical target determination section determines that the radar detection target and the image detection target are an identical target.

10. The target detection device according to claim 9, further comprising:
a type determination section; and
a longer dimension calculation section, wherein:
the specific target includes a plurality of types of the targets;
the type determination section determines which type of the plurality of types of the targets of the specific target that the image detection target detected by the image detection target position detecting section is;
the longer dimension calculation section determines a longer dimension for the type determined by the type determination section, and calculates the longer dimension of the image detection target in real space, the longer dimension being a lateral width or a height, whichever is expected to be longer, the lateral width being a length in a vehicle width direction; and
the abnormal size determination section determines whether the size of the image detection target is the abnormal size, depending on whether the longer dimension of the image detection target in real space calculated by the longer dimension calculation section is greater than a determination value set to be greater than an upper limit value of the longer dimension expected for the type specified by the type determination section.

11. The target detection device according to claim 10, wherein:
the plurality of types of the targets includes a pedestrian;
when the type determination section determines that the image detection target is the pedestrian, the longer dimension calculation section calculates a height of the image detection target in real space; and
the abnormal size determination section determines whether the size of the image detection target is the abnormal size, depending on whether the height of the image detection target in real space calculated by the longer dimension calculation section is longer than the determination value.

12. The target detection device according to claim 10, wherein:
the plurality of types of the targets includes a vehicle;
when the type determination section determines that the image detection target is the vehicle, the longer dimension calculation section calculates a lateral width of the image detection target in real space; and
the abnormal size determination section determines whether the size of the image detection target is the abnormal size, depending on whether the lateral width of the image detection target in real space calculated by the longer dimension calculation section is longer than the determination value.

13. The target detection device according to claim 9, further comprising:
a type determination section; and
a longer dimension calculation section, wherein:
the specific target includes a plurality of types of the targets;
the type determination section determines which type of the plurality of types of the targets of the specific target that the image detection target detected by the image detection target position detecting section is;
the longer dimension calculation section determines a longer dimension for the type determined by the type determination section, and calculates the longer dimension of the image detection target in real space, the longer dimension being a total length or a height, whichever is expected to be longer, the total length being a length in a vehicle width direction;
the plurality of types of the targets includes a bicycle; and
when the type determination section determines that the image detection target is a longitudinally directed bicycle, the abnormal size determination section determines whether the size of the image detection target is the abnormal size, depending on whether the height of the image detection target in real space calculated by the longer dimension calculation section is greater than a determination value, and
when the type determination section determines that the image detection target is a laterally directed bicycle, the abnormal size determination section determines whether the size of the image detection target is the abnormal size, depending on whether the total length of the image detection target in real space calculated by the longer dimension calculation section is greater than a determination value.

14. A target detection device for acquiring reflection information from a radar device and acquiring an image from a monocular camera, the radar device transmitting a search wave toward an area ahead of a vehicle in its direction of travel and receiving a reflected wave reflected by a target, the reflection information being based on the reflected wave, the monocular camera capturing an image of the area ahead of the vehicle in its direction of travel, the target detection device comprising:
a radar detection target position detecting section that detects a position of a radar detection target which is a target detected on the basis of the reflection information;
an image detection target position detecting section that detects, on the basis of the image acquired from the monocular camera, a specific target that is likely to collide with the vehicle, and detects a position of an image detection target which is the detected specific target;
an identical target provisional determination section that when a positional relationship between the radar detection target and the image detection target becomes a predetermined relationship, provisionally determines that the radar detection target and the image detection target are an identical target;
a predetermined target determination section that determines whether the image detection target is a predetermined target that can be passed by the vehicle; and
an identical target determination section that when the identical target provisional determination section provisionally determines that the radar detection target and the image detection target are an identical target, and the predetermined target determination section determines that the image detection target is the predetermined target, determines that the radar detection target and the image detection target are not an identical target, and when the identical target provisional determination section provisionally determines that the radar detection target and the image detection target are an identical target, and the predetermined target determination section determines that the image detection target is not the predetermined target, determines that the radar detection target and the image detection target are an identical target, the target detection device further comprising:

an abnormal size determination section that determines whether a size of the image detection target in real space is an abnormal size that is greater than a size expected when the image detection target is the specific target, wherein:

when the identical target provisional determination section provisionally determines that the radar detection target and the image detection target are an identical target, the predetermined target determination section determines that the image detection target is not the predetermined target, and the abnormal size determination section determines that the size of the image detection target is the abnormal size, the identical target determination section determines that the radar detection target and the image detection target are not an identical target, and when the identical target provisional determination section provisionally determines that the radar detection target and the image detection target are an identical target, the predetermined target determination section determines that the image detection target is not the predetermined target, and the abnormal size determination section determines that the size of the image detection target is not the abnormal size, the identical target determination section determines that the radar detection target and the image detection target are an identical target, the target detection device further comprising:

a type determination section; and a longer dimension calculation section, wherein:

the specific target includes a plurality of types of the targets;

the type determination section determines which type of the plurality of types of the targets of the specific target that the image detection target detected by the image detection target position detecting section is;

the longer dimension calculation section determines a longer dimension for the type determined by the type determination section, and calculates the longer dimension of the image detection target in real space, the longer dimension being a lateral width or a height, whichever is expected to be longer, the lateral width being a length in a vehicle width direction; and the abnormal size determination section determines whether the size of the image detection target is the abnormal size, depending on whether the longer dimension of the image detection target in real space calculated by the longer dimension calculation section is greater than a determination value set to be greater than an upper limit value of the longer dimension expected for the type specified by the type determination section.

15. A target detection device for acquiring reflection information from a radar device and acquiring an image from a monocular camera, the radar device transmitting a search wave toward an area ahead of a vehicle in its direction of travel and receiving a reflected wave reflected by a target, the reflection information being based on the reflected wave, the monocular camera capturing an image of the area ahead of the vehicle in its direction of travel, the target detection device comprising:

a radar detection target position detecting section that detects a position of a radar detection target which is a target detected on the basis of the reflection information;

an image detection target position detecting section that detects, on the basis of the image acquired from the monocular camera, a specific target that is likely to collide with the vehicle, and detects a position of an image detection target which is the detected specific target;

an identical target provisional determination section that when a positional relationship between the radar detection target and the image detection target becomes a predetermined relationship, provisionally determines that the radar detection target and the image detection target are an identical target;

a predetermined target determination section that determines whether the image detection target is a predetermined target that can be passed by the vehicle; and an identical target determination section that when the identical target provisional determination section provisionally determines that the radar detection target and the image detection target are an identical target, and the predetermined target determination section determines that the image detection target is the predetermined target, determines that the radar detection target and the image detection target are not an identical target, and when the identical target provisional determination section provisionally determines that the radar detection target and the image detection target are an identical target, and the predetermined target determination section determines that the image detection target is not the predetermined target, determines that the radar detection target and the image detection target are an identical target, the target detection device further comprising:

an abnormal size determination section that determines whether a size of the image detection target in real space is an abnormal size that is greater than a size expected when the image detection target is the specific target, wherein:

when the identical target provisional determination section provisionally determines that the radar detection target and the image detection target are an identical target, the predetermined target determination section determines that the image detection target is not the predetermined target, and the abnormal size determination section determines that the size of the image detection target is the abnormal size, the identical target determination section determines that the radar detection target and the image detection target are not an identical target, and when the identical target provisional determination section provisionally determines that the radar detection target and the image detection target are an identical target, the predetermined target determination section determines that the image detection target is not the predetermined target, and the abnormal size determination section determines that the size of the image detection target is not the abnormal size, the identical target determination section determines that the radar detection target and the image detection target are an identical target, the target detection device further comprising:

a type determination section; and a longer dimension calculation section, wherein:

the specific target includes a plurality of types of the targets;

the type determination section determines which type of the plurality of types of the targets of the specific target that the image detection target detected by the image detection target position detecting section is;

the longer dimension calculation section determines a longer dimension for the type determined by the type determination section, and calculates the longer dimension of the image detection target in real space, the longer dimension being a total length or a height, whichever is expected to be longer, the total length being a length in a vehicle width direction;

the plurality of types of the targets includes a bicycle; and when the type determination section determines that the image detection target is a longitudinally directed bicycle, the abnormal size determination section determines whether the size of the image detection target is the abnormal size, depending on whether the height of the image detection target in real space calculated by the longer dimension calculation section is greater than a determination value, and when the type determination section determines that the image detection target is a laterally directed bicycle, the abnormal size determination section determines whether the size of the image detection target is the abnormal size, depending on whether the total length of the image detection target in real space calculated by the longer dimension calculation section is greater than a determination value.

* * * * *